United States Patent
Young et al.

(10) Patent No.: US 11,048,143 B1
(45) Date of Patent: Jun. 29, 2021

(54) SINGLE BEAMLINE MULTIWAVELENGTH INFRARED RADIATION SOURCE

(71) Applicant: BAE Systems Information and Electronic Systems Integration, Inc., Nashua, NH (US)

(72) Inventors: York E. Young, Amherst, NH (US); Andrew J. Radl, Dunbarton, NH (US); Glen A. Rines, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/061,818

(22) Filed: Oct. 2, 2020

(51) Int. Cl.
   *G02F 1/35* (2006.01)
   *G02F 1/355* (2006.01)
   *G02F 1/39* (2006.01)

(52) U.S. Cl.
   CPC .......... *G02F 1/3507* (2021.01); *G02F 1/3548* (2021.01); *G02F 1/3551* (2013.01); *G02F 1/39* (2013.01); *G02F 2203/11* (2013.01)

(58) Field of Classification Search
   CPC .... G02F 1/3507; G02F 1/3548; G02F 1/3551; G02F 1/39; G02F 2203/11
   See application file for complete search history.

(56) References Cited

U.S. PATENT DOCUMENTS

| | | | | |
|---|---|---|---|---|
| 9,599,875 B2* | 3/2017 | Rines | | G02F 1/3532 |
| 9,653,880 B2* | 5/2017 | Mueller | | H01S 3/0933 |
| 10,247,606 B2* | 4/2019 | Malcolm | | G01N 21/49 |
| 10,474,002 B2* | 11/2019 | Petersen | | G02F 1/3525 |
| 2012/0162748 A1* | 6/2012 | Fermann | | G02F 1/353 |
| | | | | 359/330 |
| 2019/0155126 A1* | 5/2019 | Pomeranz | | G02F 1/39 |
| 2020/0386676 A1* | 12/2020 | Stentz | | G01S 17/894 |

OTHER PUBLICATIONS

Lippert et al., "A 22-watt mid-infrared optical parametric oscillator with V-shaped 3-mirror ring resonator", Optics Express, vol. 18, No. 25, p. 26475-26483, Dec. 2, 2010. (Year: 2010).*

* cited by examiner

*Primary Examiner* — Daniel Petkovsek
(74) *Attorney, Agent, or Firm* — Sand, Sebolt & Wernow LPA (57) ABSTRACT

Systems and methods for generating infrared radiation are provided. The systems and methods may generate, via one or more pump sources, one or more pump beams. The one or more pump beams may define a single beamline. The systems and methods may further generate, via a nonlinear optical converter, a first signal wavelength, a first idler wavelength, a second signal wavelength, and a second idler wavelength based, at least in part, on the one or more pump beams. The first signal wavelength and the first idler wavelength may be independently variable from the second signal wavelength and the second idler wavelength. The systems and methods may further output, via the nonlinear optical converter, a mid-wave infrared (MWIR) beam including three or more wavelengths in the single beamline.

20 Claims, 5 Drawing Sheets

SINGLE BEAMLINE MULTIWAVELENGTH INFRARED RADIATION SOURCE

TECHNICAL FIELD

The present disclosure relates generally to radiation sources. More particularly, the present disclosure relates to single beamline multiwavelength infrared radiation sources including nonlinear optical converters.

BACKGROUND

Coherent radiation sources operating in the mid-infrared (mid-IR) spectrum are the subjects of ongoing research due to their usefulness in such a wide variety of applications. Some exemplary applications include remote sensing, chemical/pollutants detection, military systems, and nondestructive testing of materials.

One conventional source of coherent radiation operating in the mid-IR spectrum utilizes a pump source and nonlinear optical converters, such as optical parametric oscillators (OPOs). An OPO is a nonlinear device that converts incident photons into photon pairs when the incident photons are optically excited at a power per unit area above a specific threshold level. More particularly, the OPO converts a pump beam with frequency $\omega_p$ into two output waves of lower frequency, $\omega_s$ and $\omega_i$, through a second-order nonlinear optical interaction. The output wave with the higher frequency, $\omega_s$, is referred to as a "signal," and the output wave with a lower frequency is referred to as an "idler." The sum of the frequencies of the output waves is equal to the input frequency of the pump beam (i.e., $\omega_p = \omega_s + \omega_i$).

In this conventional system, a first infrared band is produced by a pump source, such as a pump laser, a second infrared band is generated by a signal of a first OPO, a third infrared band is generated by an idler of the first OPO, and a fourth infrared band is generated through a combination of a signal and an idler of a second OPO. To accomplish this, the pump laser is typically split to pump the two OPOs. However, one disadvantage of this conventional system is that there are two separate beamlines from the two OPOs which need to be recombined into one output beam. Recombining and co-aligning the two separate beams into one output beam typically requires complex laser and opto-mechanical engineering, which increases material costs, labor costs, and size while also reducing the reliability of the system.

SUMMARY

In some instances, generating multiband infrared light in single beamlines is difficult. The present disclosure addresses these and other issues.

In one aspect, an exemplary embodiment of the present disclosure may provide an infrared radiation source system, comprising: one or more pump sources configured to generate one or more pump beams; wherein the one or more pump beams define a single beamline; and a nonlinear optical converter aligned along the single beamline; wherein the nonlinear optical converter generates a first signal wavelength, a first idler wavelength, a second signal wavelength, and a second idler wavelength; wherein the first signal wavelength and the first idler wavelength are independently variable from the second signal wavelength and the second idler wavelength; and wherein the infrared radiation source system is configured to output a mid-wave infrared (MWIR) beam including three or more wavelengths in the single beamline.

The nonlinear optical converter may include a first phase-matching condition of the nonlinear optical converter; and a second phase-matching condition of the nonlinear optical converter. In some implementations, the infrared radiation source system may include a first MWIR wavelength of the MWIR beam; a second MWIR wavelength of the MWIR beam; a third MWIR wavelength of the MWIR beam; and a fourth MWIR wavelength of the MWIR beam. In some implementations, the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength. The first MWIR wavelength, the second MWIR wavelength, the third MWIR wavelength, and the fourth MWIR wavelength may be tunable.

In some implementations, the infrared radiation source system may include a first nonlinear optical crystal of the nonlinear optical converter aligned along the single beamline; and a second nonlinear optical crystal of the nonlinear optical converter aligned along the single beamline; wherein the first nonlinear optical crystal and the second nonlinear optical crystal are critically phase-matched. In other implementations, the infrared radiation source system may include a quasi-phase-matched crystal of the nonlinear optical converter; a first quasi-phase-matched region of the quasi-phase-matched crystal aligned along the single beamline; and a second quasi-phase-matched region of the quasi-phase-matched crystal aligned along the single beamline.

In some implementations, the nonlinear optical converter of the infrared radiation source system is an optical parametric oscillator (OPO), and the infrared radiation source system further comprises: a ring cavity of the OPO; a at least one reflective optical element positioned within the ring cavity and along the single beamline; a first nonlinear optical crystal of the OPO aligned along the single beamline; and a second nonlinear optical crystal of the OPO aligned along the single beamline; wherein the first nonlinear optical crystal and the second nonlinear optical crystal are critically phase-matched. In other implementations, the infrared radiation source system may include a walk-off compensated pair of nonlinear optical crystals of the OPO aligned along the single beamline. In yet other implementations, the infrared radiation source system may include a quasi-phase-matched crystal of the OPO; a first quasi-phase-matched region of the quasi-phase-matched crystal aligned along the single beamline; and a second quasi-phase-matched region of the quasi-phase-matched crystal aligned along the single beamline.

In another aspect, an exemplary embodiment of the present disclosure may provide a method for generating infrared radiation, comprising: generating, via one or more pump sources, one or more pump beams; wherein the one or more pump beams define a single beamline; generating, via a nonlinear optical converter, a first signal wavelength, a first idler wavelength, a second signal wavelength, and a second idler wavelength based, at least in part, on the one or more pump beams; wherein the first signal wavelength and the first idler wavelength are independently variable from the second signal wavelength and the second idler wavelength; and outputting, via the nonlinear optical converter, a mid-wave infrared (MWIR) beam including three or more wavelengths in the single beamline. The method may further include utilizing a first phase-matching condition of the nonlinear optical converter and a second phase-matching condition of the nonlinear optical converter to generate the first signal wavelength, the first idler wavelength, the second signal wavelength, and the second idler wavelength.

The method may further include outputting a first MWIR wavelength of the MWIR beam; outputting a second MWIR wavelength of the MWIR beam; outputting a third MWIR wavelength of the MWIR beam; and outputting a fourth MWIR wavelength of the MWIR beam. In some implementations, the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength. The method may further include tuning the first MWIR wavelength, the second MWIR wavelength, the third MWIR wavelength, and the fourth MWIR wavelength.

In some implementations, the method may further include aligning a first nonlinear optical crystal of the nonlinear optical converter along the single beamline; aligning a second nonlinear optical crystal of the nonlinear optical converter along the single beamline; and critically phase-matching the first nonlinear optical crystal and the second nonlinear optical crystal. In other implementations, the method may further include positioning a walk-off compensated pair of nonlinear optical crystals of the nonlinear optical converter along the single beamline. In yet other implementations, the method may further include aligning a first quasi-phase-matched region of a quasi-phase-matched crystal of the nonlinear optical converter along the single beamline; and aligning a second quasi-phase-matched region of a quasi-phase-matched crystal of the nonlinear optical converter along the single beamline.

In some implementations, the nonlinear optical converter may be an optical parametric oscillator (OPO), and the method may further include positioning a at least one reflective optical element within a ring cavity of the OPO; aligning the at least one reflective optical element along the single beamline; aligning a first nonlinear optical crystal of the OPO along the single beamline; and aligning a second nonlinear optical crystal of the OPO along the single beamline; and critically phase-matching the first nonlinear optical crystal and the second nonlinear optical crystal. In other implementations, the method may further include positioning a walk-off compensated pair of nonlinear optical crystals of the OPO along the single beamline. In yet other implementations, the method may further include aligning a first quasi-phase-matched region of a quasi-phase-matched crystal of the OPO along the single beamline; and aligning a second quasi-phase-matched region of a quasi-phase-matched crystal of the OPO along the single beamline.

In yet another aspect, an exemplary embodiment of the present disclosure may provide systems and methods for generating infrared radiation. The systems and methods may generate, via one or more pump sources, one or more pump beams. The one or more pump beams may define a single beamline. The systems and methods may further generate, via a nonlinear optical converter, a first signal wavelength, a first idler wavelength, a second signal wavelength, and a second idler wavelength based, at least in part, on the one or more pump beams. The first signal wavelength and the first idler wavelength may be independently variable from the second signal wavelength and the second idler wavelength. The systems and methods may further output, via the nonlinear optical converter, a mid-wave infrared (MWIR) beam including three or more wavelengths in the single beamline.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
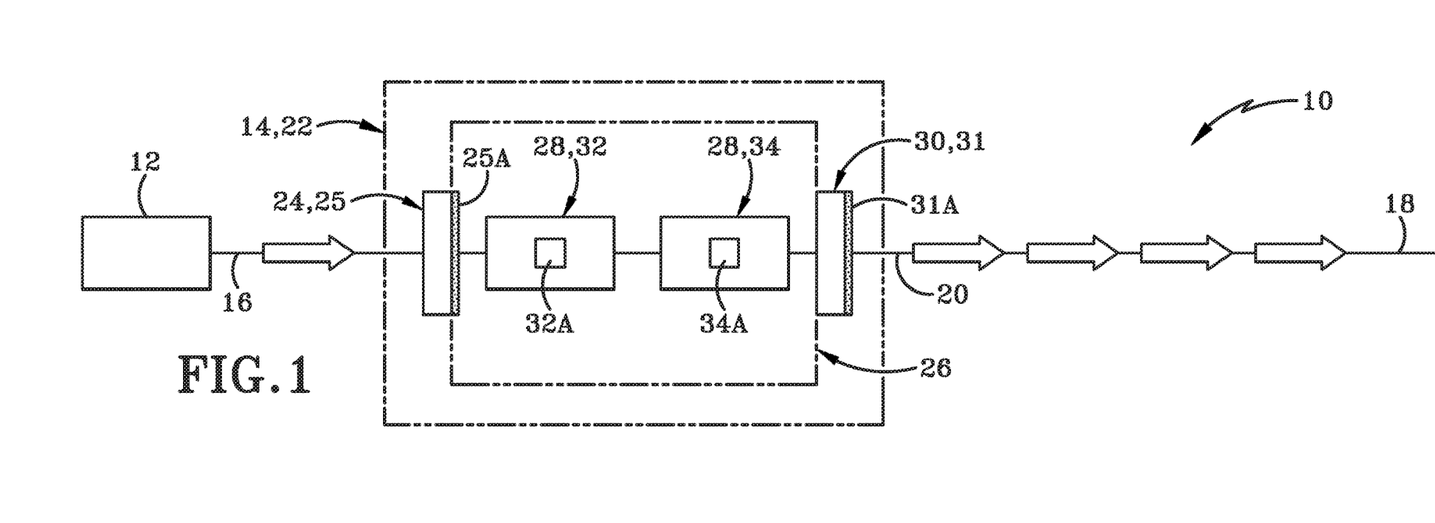
FIG. 1 depicts an exemplary first embodiment of an infrared radiation source system in accordance with one aspect of the present disclosure.

FIG. 1 depicts an exemplary first embodiment of an infrared radiation source system in accordance with one aspect of the present disclosure generally at 10. The infrared radiation source system 10 may include at least one pump source 12, which may also be referred to as pump laser 12, and at least one nonlinear optical converter 14, which may also be referred to as nonlinear optical converter 14. The pump source 12 may be in operable communication with the nonlinear optical converter 14. The pump source 12 may generate one or more pump beams 16, which may also be referred to as pump beam 16, that define a single beamline 18, and the nonlinear optical converter 14 may generate a first signal wavelength, a first idler wavelength, a second signal wavelength, and a second idler wavelength based, at least in part, on the one or more pump beams 16. The first signal wavelength and the first idler wavelength may be independently variable from the second signal wavelength and the second idler wavelength. The infrared radiation source system 10 may be configured to output a mid-wave infrared (MWIR) beam 20 including three or more wavelengths in the single beamline 18 as more fully described below. If the pump source 12 includes more than one pump beam, those beams may be combined into the single beamline 18 in any suitable manner, such as, for example, via polarization-combining and/or wavelength combining optical elements.

In some implementations, the pump source 12 may be configured to emit pulses of MWIR radiation (forming the pump beam 16) along the single beamline 18. One exemplary pump source 12 capable of providing pulses of MWIR radiation may be a pump laser configured to provide pulses of MWIR radiation. Some exemplary pump lasers configured to provide pulses of MWIR radiation may include semiconductor lasers, fiber lasers, and semiconductor lasers.

Although the pump source 12 has been described as being a pump laser configured to emit pulses of MWIR radiation forming the pump beam 16 along the single beamline 18, the pump source 12 may be any suitable pump source configured to emit any suitable radiation.

For exemplary purposes, the nonlinear optical converter 14 of the infrared radiation source system 10 may be an optical parametric oscillator 22, however, any suitable nonlinear optical converter may be utilized, such as, for example, difference frequency generators (DFG) sum frequency generators (SFG), and second harmonic generators (SHG). As stated above, an OPO is a nonlinear device that converts incident photons into photon pairs when the incident photons are optically excited at a power per unit area above a specific threshold level. Generally, an OPO converts a pump beam with frequency $\omega_p$ into two output waves of lower frequency, $\omega_s$ and $\omega_i$, through a nonlinear optical interaction, such as, for example, a second-order nonlinear optical interaction. The output wave with the higher frequency, $\omega_s$, may be referred to as a "signal beam" having a signal wavelength, and the output wave with the lower frequency may be referred to as an "idler beam" having an idler wavelength. The sum of the frequencies of the output waves are equal to the input frequency of the pump beam (i.e., $\omega_p=\omega_s+\omega_i$). In some implementations, the OPO 22 may generate a first signal beam having a first signal wavelength, a first idler wavelength having a first idler wavelength, a second signal beam having a second signal wavelength, and a second idler beam having a wavelength, based, at least in part, on the one or more pump beams 16 as more fully described below. The first signal wavelength and the first idler wavelength may be independently variable from the second signal wavelength and the second idler wavelength.

With continued reference to FIG. 1, the OPO 22 may include an input coupler 24, an optical resonator 26, at least one nonlinear optical element 28, and an output coupler 30. The at least one nonlinear optical element 28 may be positioned within the optical resonator 26 and between the input coupler 24 and the output coupler 30. The input coupler 24, the optical resonator 26, the at least one nonlinear optical element 28 and the output coupler 30 may be in operable communication with the pump beam 16 generated by the pump source 12.

In some implementations, the input coupler 24 may be a dichroic mirror 25, which is a mirror that reflects and transmits particular wavelengths of radiation. For example, the dichroic mirror 25 may include at least one coating 25A configured to control and/or optimize the reflection and transmission of the pump beam 16, the first signal beam, and the idler beam. Although a particular input coupler 24 has been described, it is to be understood that the input coupler 24 may be any suitable input coupling mechanism.

With continued reference to FIG. 1, and in accordance with the first embodiment of the infrared radiation source system 10, the at least one nonlinear optical element 28 may include a first nonlinear optical crystal 32 and a second nonlinear optical crystal 34. The optical resonator 26 may resonate one or more of the first signal beam, the first idler beam, the second signal beam, and the second idler beam. The first signal beam, the first idler beam, the second signal beam, and the second idler beam may overlap in the first nonlinear optical crystal 32 and the second nonlinear optical crystal 34. The pump beam 16, first signal beam, the first idler beam, the second signal beam, and the second idler beam may interact with one another, and, as a result, parametric amplification of the signal beam and idler beam may occur (i.e., there is a gain in the amplitude of the first signal beam, the first idler beam, the second signal beam, and the second idler beam) while de-amplification of the pump beam 16 occurs (i.e., there is a decrease in the amplitude of the pump beam 16).

At low pump source power, there may be insufficient gain to support oscillation of the first signal beam, the first idler beam, the second signal beam, and/or the second idler beam. If the pump source power reaches a threshold level, the first signal beam, the first idler beam, the second signal beam, and the second idler beam may oscillate. When the pump source power is above the threshold, the gain depends on the amplitude of the resonated first signal beam, first idler beam, second signal beam, and/or second idler beam. Thus, in steady-state operation, the amplitude of the resonated first signal beam, first idler beam, second signal beam, and second idler beam may be determined by the condition that the gain equals the constant loss of the amplitude of the first signal beam, the first idler beam, the second signal beam, and the second idler beam. As such, an increase in pump source 12 power of the system 10 may increase the circulating amplitude and the output power of the system 10.

In some implementations, the first nonlinear optical crystal 32 and the second nonlinear optical crystal 34 may be critically phase-matched with one another under two separate phase-matching conditions. As such, the first nonlinear optical crystal 32 and the second nonlinear optical crystal 34 may be critically phase-matched based, at least in part, on a first critically phase-matched condition and a second critically phase-matched condition forming a first critically phase-matched region 32A and a second critically phase-matched region 34A. This may allow two separate OPO processes to occur and the wavelengths of the MWIR beam 20 may include at least a pump beam wavelength, the first signal wavelength, the first idler wavelength, the second signal wavelength, and the second idler wavelength, and/or a combination of the pump beam wavelength, the first signal wavelength, the first idler wavelength, the second signal wavelength, and the second idler wavelength. Critical phase-matching may be accomplished via an angular adjustment of the first nonlinear optical crystal 32, the second nonlinear optical crystal 34, or the pump beam 16, to optimize a phase-matching configuration. Some exemplary MWIR nonlinear optical crystals include Zinc Germanium Phosphide (ZGP, ZnGeP2) and Cadmium Silicon Phosphide (CSP, CdSiP2). Although exemplary MWIR nonlinear optical crystals have been described, it should be understood that the first nonlinear optical crystal 32 and the second nonlinear optical crystal 34 may be any suitable nonlinear optical crystals, such as, for example, MWIR nonlinear optical crystals exhibiting high gain, broad wavelength coverage, and scalability to high energies and average powers.

In some implementations, the output coupler 30 may be a dichroic mirror 31, which is a mirror that reflects and transmits particular wavelengths of radiation. For example, the dichroic mirror 31 may include at least one coating 31A configured to control and/or optimize the reflection and transmission of the pump beam 16, the first signal beam, the first idler beam, the second signal beam, and the second idler beam. Although a particular output coupler 30 has been described, it is to be understood that the out coupler 30 may be any suitable output coupling mechanism.

In operation, the pump source 12 may emit the pump beam 16 along the single beamline 18. The pump beam 16 may be received by the OPO 22. More particularly, the input coupler 24, which may be configured to reflect the pump beam 16, may couple the pump beam 16 to the optical resonator 26. The pump beam 16 may propagate through the first critically phase-matched region 32A of the first nonlinear optical crystal 32 and the second critically phase-matched region 34A of the second nonlinear optical crystal 34. The first nonlinear optical crystal 32 and the second nonlinear optical crystal 34 may convert some of the pump beam 16 into the first signal beam, the first idler beam, the second signal beam and the second idler beam. The pump beam 16, the first signal beam, the first idler beam, the second signal beam, and the second idler beam may propagate in the same direction.

The output coupler 30 may partially reflect the pump beam, the first signal beam, the first idler beam, the second signal beam, and the second idler beam out of the optical resonator 26 as an MWIR beam 20 in the single beamline 18 while also partially reflecting the pump beam, the first signal beam, the first idler beam, the second signal beam, and the second idler beam back into the optical resonator 26. In some implementations, the MWIR beam 20 may include a first MWIR wavelength, a second MWIR wavelength, a third MWIR wavelength, and a fourth MWIR wavelength where the first multiwavelength may include the pump beam wavelength, and where the second MWIR wavelength, the third MWIR wavelength, and the fourth MWIR wavelength may include at least one of the first signal wavelength, the first idler wavelength, the second signal wavelength, and the second idler wavelength.

Further, the wavelengths of the MWIR beam 20 may be tuned utilizing a number of techniques. For example, the wavelengths of the MWIR beam may be tuned by changing the frequency of the pump beam 16, by changing the phase matching properties of the nonlinear optical crystals, or by applying a variable voltage across the nonlinear optical crystals. For example, when the first nonlinear optical crystal 32 and the second nonlinear optical crystal 34 need to be critically phase-matched, this may be accomplished by rotating the first nonlinear optical crystal 32 and/or the second nonlinear optical crystal 34 relative to the direction of the pump beam 16. The first nonlinear optical crystal 32 and/or the second nonlinear optical crystal 34 may be rotated relative to the direction of the pump beam 16 in any suitable manner, such as, for example, through operable engagement with a motor. The nonlinear optical crystals may also be non-critically phase-matched by varying the temperature of the nonlinear optical crystals. Although some exemplary MWIR beam 20 tuning techniques have been described, it is to be understood that any suitable tuning techniques may be utilized.

As such, and in some implementations, the infrared radiation source system 10 may allow for broadband tunability of the MWIR beam 20 over the full MWIR spectrum in a single beamline 18 by utilizing a single pump source 12 to optically pump a single OPO 22 that contains two separate phase-matching conditions in two discrete nonlinear optical crystals 32, 34. More particularly, the OPO 22 generates a first signal wavelength, a first idler wavelength, a second signal wavelength, and a second idler wavelength. The first signal wavelength and the first idler wavelength may be independently variable from the second signal wavelength and the second idler wavelength. In some implementations, the pump beam, the first signal beam, the first idler beam, the second signal beam, and the second idler beam may all propagate along a substantially similar path.

One exemplary benefit of the first signal wavelength and the first idler wavelength being independently variable from the second signal wavelength and the second idler wavelength is that it allows design flexibility (e.g., allowing various OPO 22 geometries and architectures to be utilized) in generating the desired MWIR beam 20 including three or more wavelengths in the single beamline. This is advantageous over conventional multiwavelength infrared radiation sources, which cannot independently vary a first signal wavelength and a first idler wavelength from a second signal wavelength and a second idler wavelength, as conventional multiwavelength infrared radiation sources are limited to a very narrow range of OPO geometries and architectures. Other exemplary benefits of the infrared radiation source system 10 include the infrared radiation source system 10 serving as a single optical bench for generation of multiple wavelengths over the full MWIR spectrum, the size, weight, power and cost (Swap-C) of the infrared radiation system 10 is reduced compared to conventional infrared radiation source systems, and the optics count and reliability of the infrared radiation source system 10 is improved compared to conventional infrared radiation source systems.

An inherent property of non-critically phase-matched, discrete crystal configurations is walk-off in angle between beams of different wavelengths. In some implementations, and depending, at least in part, on the type of crystal utilized as the first nonlinear optical crystal 32 and the second nonlinear optical crystal 34, the first nonlinear optical crystal 32 and the second nonlinear optical crystal 34 may need to be a walk-off compensated pair of nonlinear optical crystals to achieve precise co-boresight, or precision pointing. The walk-off compensated pair of nonlinear optical crystals may also be critically-phase matched with one another.

Figure 2:
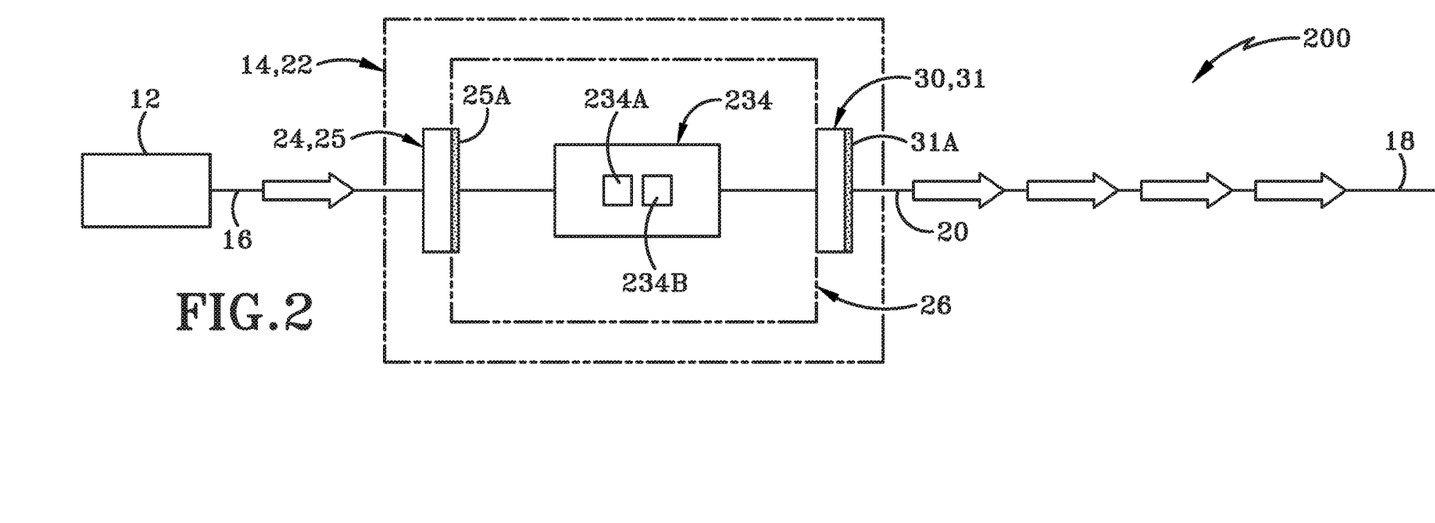
FIG. 2 depicts an exemplary second embodiment of an infrared radiation source system in accordance with one aspect of the present disclosure.

FIG. 2 depicts an exemplary second embodiment of an infrared radiation source system in accordance with one aspect of the present disclosure generally at 200. The infrared radiation source system 200 is substantially identical to the infrared radiation source system 10 of FIG. 1 in structure and function with a few exceptions/additions that will be discussed hereafter in greater detail.

With continued reference to FIG. 2, and in accordance with the second embodiment of the infrared radiation source system 200, instead of the at least one nonlinear optical element 28 of the OPO 22 being a first nonlinear optical crystal 32 and a second nonlinear optical crystal 34, the at least one nonlinear optical element 28 may be a single nonlinear optical crystal 234.

In some implementations, quasi-phase matching, which is a technique in nonlinear optics that allows a positive net flow of energy from the pump beam wavelength to the signal beam wavelength and the idler beam wavelength by creating a periodic structure in the nonlinear medium, may be applied to the nonlinear optical crystal 234. As such, the nonlinear optical crystal 234 may be quasi-phase-matched nonlinear optical crystal. Some exemplary MWIR quasi-phase-matched nonlinear optical crystals include periodically-poled lithium niobate (PPLN), periodically-poled lithium tantalate (PPLT), periodically-poled potassium titanyl arsenate (PP-KTA), orientation-patterned gallium arsenide (OP-GaAs), and orientation-patterned gallium phosphide (OP-GaP). Although exemplary MWIR quasi-phase-matched nonlinear optical crystals have been described, it should be understood that the quasi-phase-matched nonlinear optical crystal 234 may be any suitable quasi-phase-matched nonlinear optical crystals.

In operation, the infrared radiation source system 200 operates in a substantially identical manner to the infrared radiation source system 10 of FIG. 1, except that the pump beam 16 may propagate through the first quasi-phase-matched region 234A and the second quasi-phase-matched region 234B of the quasi-phase-matched nonlinear optical crystal 234 instead of through the first critically phase-matched region 32A of the first nonlinear optical crystal 32 and the second phase-matched region 34A of the second nonlinear optical crystal 34.

Figure 3:
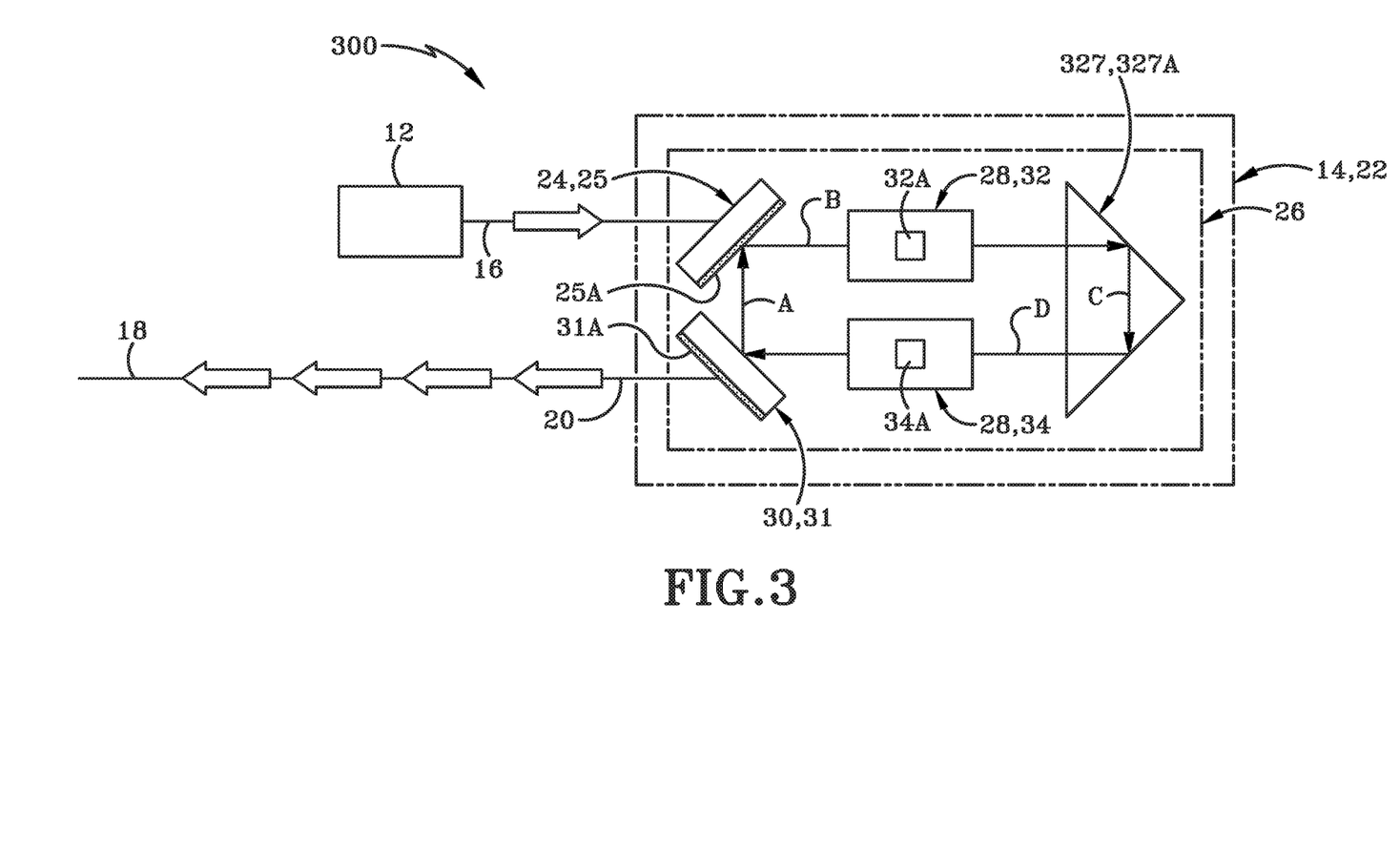
FIG. 3 depicts an exemplary third embodiment of an infrared radiation source system in accordance with one aspect of the present disclosure.

FIG. 3 depicts an exemplary third embodiment of an infrared radiation source system in accordance with one aspect of the present disclosure generally at 300. The infrared radiation source system 300 is substantially identical to the first embodiment of the infrared radiation source system 10 of FIG. 1 in structure and function with a few exceptions/additions that will be discussed hereafter in greater detail.

With continued reference to FIG. 3, and in accordance with the third embodiment of the infrared radiation source system 300, the OPO 22 of the infrared radiation source system 300 further includes at least one reflective optical element 327. In some implementations, the at least one reflective optical element 327 may be a total internal reflection prism 327A configured to route the pump beam 16, the first signal beam, the first idler beam, the second signal beam, and the second idler beam within the optical resonator 26. Although the at least one reflective optical element 327 has been described as being a total internal reflection prism, it is to be understood that the at least one reflective optical element 327 may be any suitable reflective optical elements, such as, for example, any suitable number of mirrors. In this embodiment, the input coupler 24, the total internal reflection prism 327A, and the output coupler 30 may be arranged to form a ring resonator configuration as shown in FIG. 3.

In some implementations, the at least one nonlinear optical element 28 of the OPO 22 of the infrared radiation source system 300 may be substantially identical to the at least one optical element 28 of the OPO 22 of the first embodiment of the infrared radiation source system 10 as described above. For example, the at least one nonlinear optical element 28 of the OPO 22 of the infrared radiation source system 200 may include the first nonlinear optical crystal 32 and the second nonlinear optical crystal 34 of the first embodiment of the infrared radiation source system 10. Similarly, the first nonlinear optical crystal 32 and the second nonlinear optical crystal 34 may be critically phase-matched based, at least in part, on a first critically phase-matched condition and a second critically phase-matched condition forming a first critically phase-matched region 32A and a second critically phase-matched region 34A. In this embodiment, the first nonlinear optical crystal 32 and the second nonlinear optical crystal 34 may be aligned along the single beamline 20.

As shown in FIG. 3, the OPO 22 may include a first single beamline path indicated as arrow A, a second single beamline path indicated as arrow B, a third single beamline path indicated as arrow C, and a fourth single beamline path indicated as arrow D. In some implementations, the first nonlinear optical crystal 32 may be positioned along the second single beamline path (arrow B) and the second nonlinear optical crystal 34 may be positioned along the fourth single beamline path (arrow D). Although particular positions of the first nonlinear optical crystal 32 and the second nonlinear optical crystal 34 have been described, it is to be understood that the first nonlinear optical crystal 32 and the second nonlinear optical crystal 34 may be positioned in any suitable location within the optical resonator 26, such as, for example, positioning both of the first nonlinear optical crystal 32 and the second nonlinear optical crystal 34 along the second single beamline path (arrow B), or positioning both of the first nonlinear optical crystal 32 and the second nonlinear optical crystal 34 along the fourth single beamline path (arrow D).

In some implementations, and depending, at least in part, on the type of crystal utilized as the first nonlinear optical crystal 32 and the second nonlinear optical crystal 34, the first nonlinear optical crystal 32 and the second nonlinear optical crystal 34 may need to be a walk-off compensated pair of nonlinear optical crystals to achieve precise co-boresight, or precision pointing. The walk-off compensated pair of nonlinear optical crystals may also be critically-phase matched with one another.

In operation, the pump source 12 may emit the pump beam 16 along the single beamline 18. The pump beam 16 may be received by the OPO 22. More particularly, the input coupler 24, which may be configured to reflect the pump beam 16, may couple the pump beam 16 to the optical resonator 26. The pump beam 16 may propagate through the input coupler 24 in a direction along the first single beamline path (arrow A) toward the total internal reflection prism 327A along the second single beamline path (arrow B). The pump beam 16 propagates through the first critically phase-matched region 32A of the nonlinear optical crystal 32 toward the total internal reflection prism 327A. The first nonlinear optical crystal 32 may convert some of the pump beam 16 into the first signal beam and the first idler beam. The pump beam, the first signal beam and the first idler beam may be reflected by the total internal reflection prism 327A along the third single beamline path (arrow C). The pump beam, the first signal beam, and the first idler beam may be reflected by the total internal reflection prism 327A along the fourth single beamline path (arrow D) toward the output coupler 30. The pump beam, the signal beam, and the idler beam may propagate through the second critically phase-matched region 34A of the second nonlinear optical crystal 34 toward the total output coupler 30. The second nonlinear optical crystal 34 may convert some of the pump beam 16 into the second signal beam and the second idler beam.

The pump beam 16, the first signal beam, the first idler beam, the second signal beam, and the second idler beam may propagate in the same direction. The output coupler 30 may partially reflect the pump beam, the first signal beam, the first idler beam, the second signal beam, and the second idler beam out of the optical resonator 26 as an MWIR beam 20 including three or more wavelengths in the single beamline 18 while also partially reflecting the pump beam, the first signal beam, the first idler beam, the second signal beam, and the second idler beam back into the optical resonator 26. In some implementations, the MWIR beam 20 may include a first MWIR wavelength, a second MWIR wavelength, a third MWIR wavelength, and a fourth MWIR wavelength where the first multiwavelength may include a pump beam wavelength, and where the second MWIR wavelength, the third MWIR wavelength, and the fourth MWIR wavelength may include at least one of the first signal beam, the first idler beam, the second signal beam, and the second idler beam.

Figure 4:
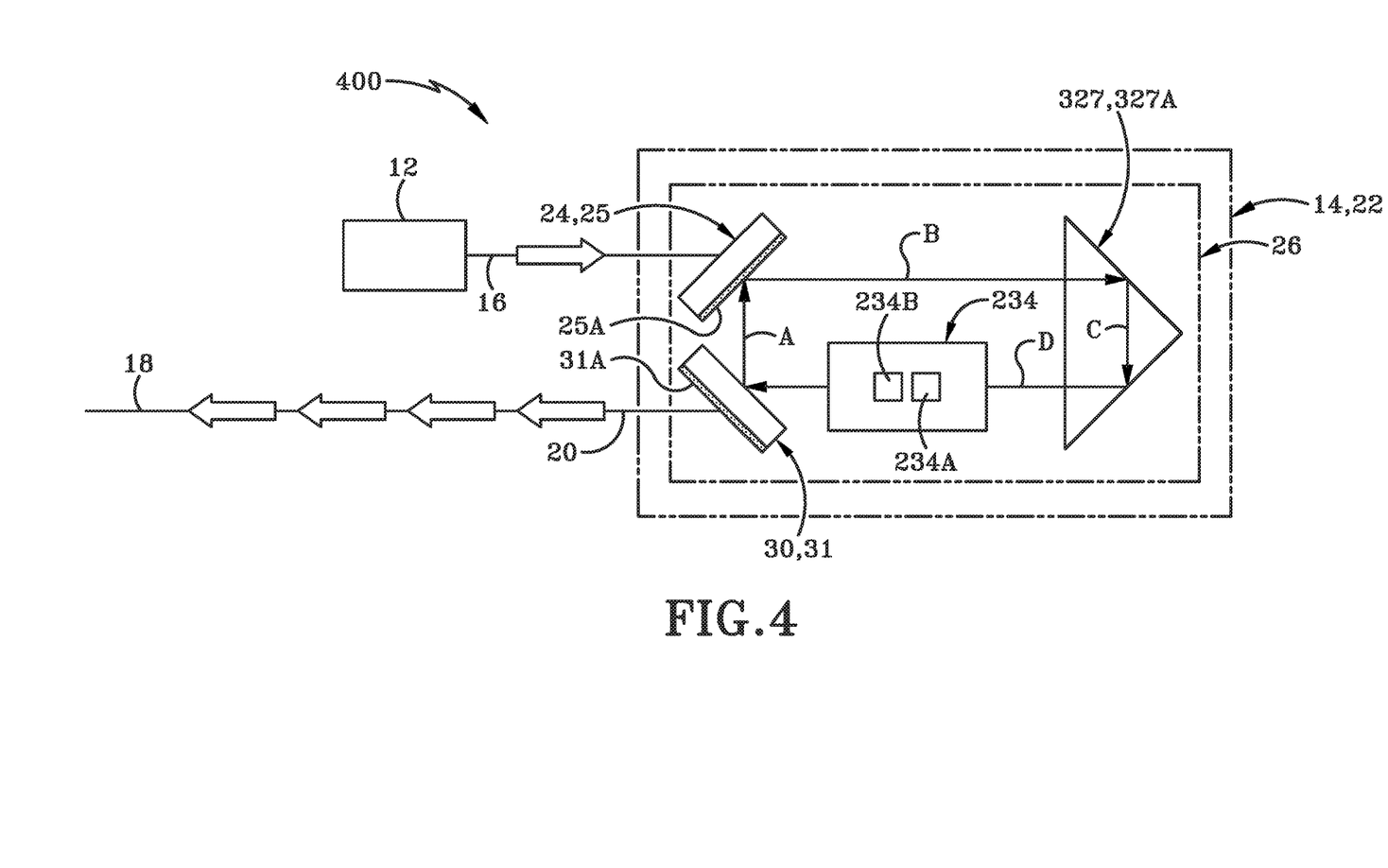
FIG. 4 depicts an exemplary fourth embodiment of an infrared radiation source system in accordance with one aspect of the present disclosure.

FIG. 4 depicts an exemplary fourth embodiment of an infrared radiation source system in accordance with one aspect of the present disclosure generally at 400. The infrared radiation source system 400 is substantially identical to the infrared radiation source system 300 of FIG. 3 in structure and function with a few exceptions/additions that will be discussed hereafter in greater detail.

With continued reference to FIG. 4, and in some implementations, the at least one nonlinear optical element 28 of the OPO 22 of the infrared radiation source system 400 may be substantially identical to the at least one optical element 28 of the OPO 22 of the second embodiment of the infrared radiation source system 200 as described above. For example, the at least one nonlinear optical element 28 of the OPO 22 of the infrared radiation source system 400 may include the quasi-phase-matched nonlinear optical crystal 234 of the second embodiment of the infrared radiation source system 200 as described above. The quasi-phase-matched nonlinear optical crystal 234 may include a first quasi-phase-matched region 234A and a second quasi-phase-matched region 234B. In this embodiment, the quasi-phase-matched nonlinear optical crystal 234 may be aligned along one of the first single beamline path (arrow A), the second single beamline path (arrow B), the third single beamline path (arrow C), and the fourth single beamline path (arrow D). For exemplary purposes, and as shown in FIG. 4, the quasi-phase-matched nonlinear optical crystal 234 may be positioned along the fourth single beamline path (arrow D).

In operation, the infrared radiation source system 400 operates in a substantially identical manner to the infrared radiation source system 300 of FIG. 3, except that the pump beam 16 may propagate through the first quasi-phase-matched region 234A and the second quasi-phase-matched region 234B of the quasi-phase-matched nonlinear optical crystal 234 instead of through the first critically phase-matched region 32A of the first nonlinear optical crystal 32 and the second critically phase-matched region 34A of the second nonlinear optical crystal 34.

Figure 5:
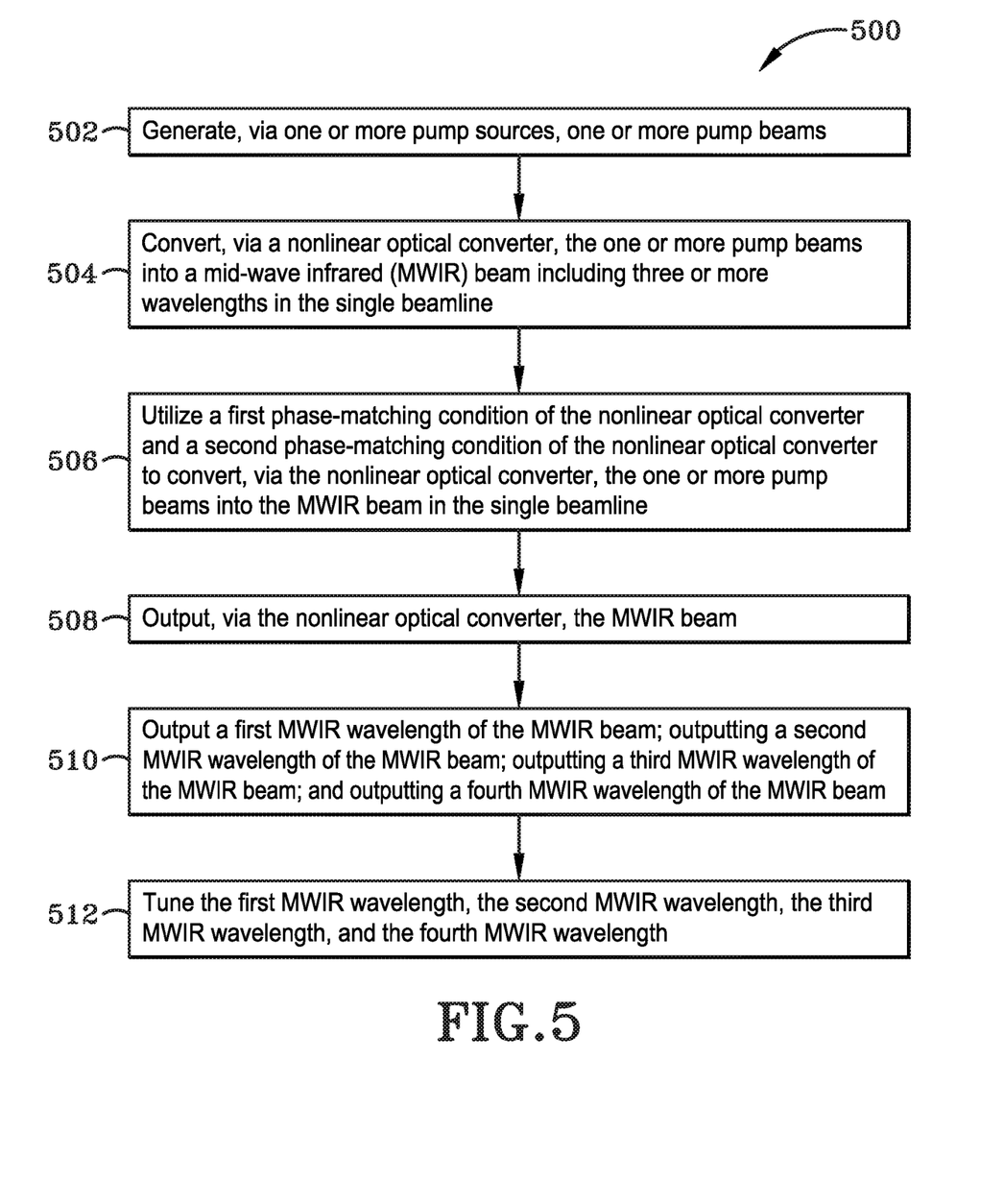
FIG. 5 is a flow chart depicting a first exemplary method in accordance with one aspect of the present disclosure.

FIG. 5 is a flow chart depicting a first exemplary method for generating infrared radiation in accordance with one aspect of the present disclosure generally at 500. The method 500 may include generating, via one or more pump sources, one or more pump beams, which is shown generally at 502. The one or more pump beams may define a single beamline. The method 500 may include converting, via a nonlinear optical converter, the one or more pump beams into a mid-wave infrared (MWIR) beam including three or more wavelengths in the single beamline, which is shown generally at 504. In some implementations, this is accomplished by the OPO generating a first signal wavelength, a first idler wavelength, a second signal wavelength, and a second idler wavelength where the first signal wavelength and the first idler wavelength may be independently variable from the second signal wavelength and the second idler wavelength. The MWIR beam may be based, at least in part on the pump beam, the first signal beam, the first idler beam, the second signal beam, and the second idler beam. The first signal wavelength and the first idler wavelength may be varied and/or the second signal wavelength and the second idler wavelength may be varied to output the desired MWIR beam.

The method 500 may further include utilizing a first phase-matching condition of the nonlinear optical converter and a second phase-matching condition of the nonlinear optical converter to convert, via the nonlinear optical converter, the one or more pump beams into the MWIR beam in the single beamline, which is shown generally at 506. For example, the first phase-matching condition and the second phase-matching condition may be implemented by at least one of aligning a first nonlinear optical crystal of the nonlinear optical converter along the single beamline, aligning a second nonlinear optical crystal of the nonlinear optical converter along the single beamline, and critically phase-matching the first nonlinear optical crystal and the second nonlinear optical crystal; positioning a walk-off compensated pair of nonlinear optical crystals of the nonlinear optical converter along the single beamline; and aligning a first quasi-phase-matched region of a quasi-phase-matched crystal of the nonlinear optical converter and a second quasi-phase-matched region of the quasi-phase-matched crystal of the nonlinear optical converter along the single beamline. The method 500 may include outputting, via the nonlinear optical converter, the MWIR beam, which is shown generally at 508. The method 500 may further include outputting a first MWIR wavelength of the MWIR beam; outputting a second MWIR wavelength of the MWIR beam; outputting a third MWIR wavelength of the MWIR beam; and outputting a fourth MWIR wavelength of the MWIR beam, which is shown generally at 510. In some implementations, the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength. The method 500 may further include tuning the first MWIR wavelength, the second MWIR wavelength, the third MWIR wavelength, and the fourth MWIR wavelength, which is shown generally at 512.

Figure 6:
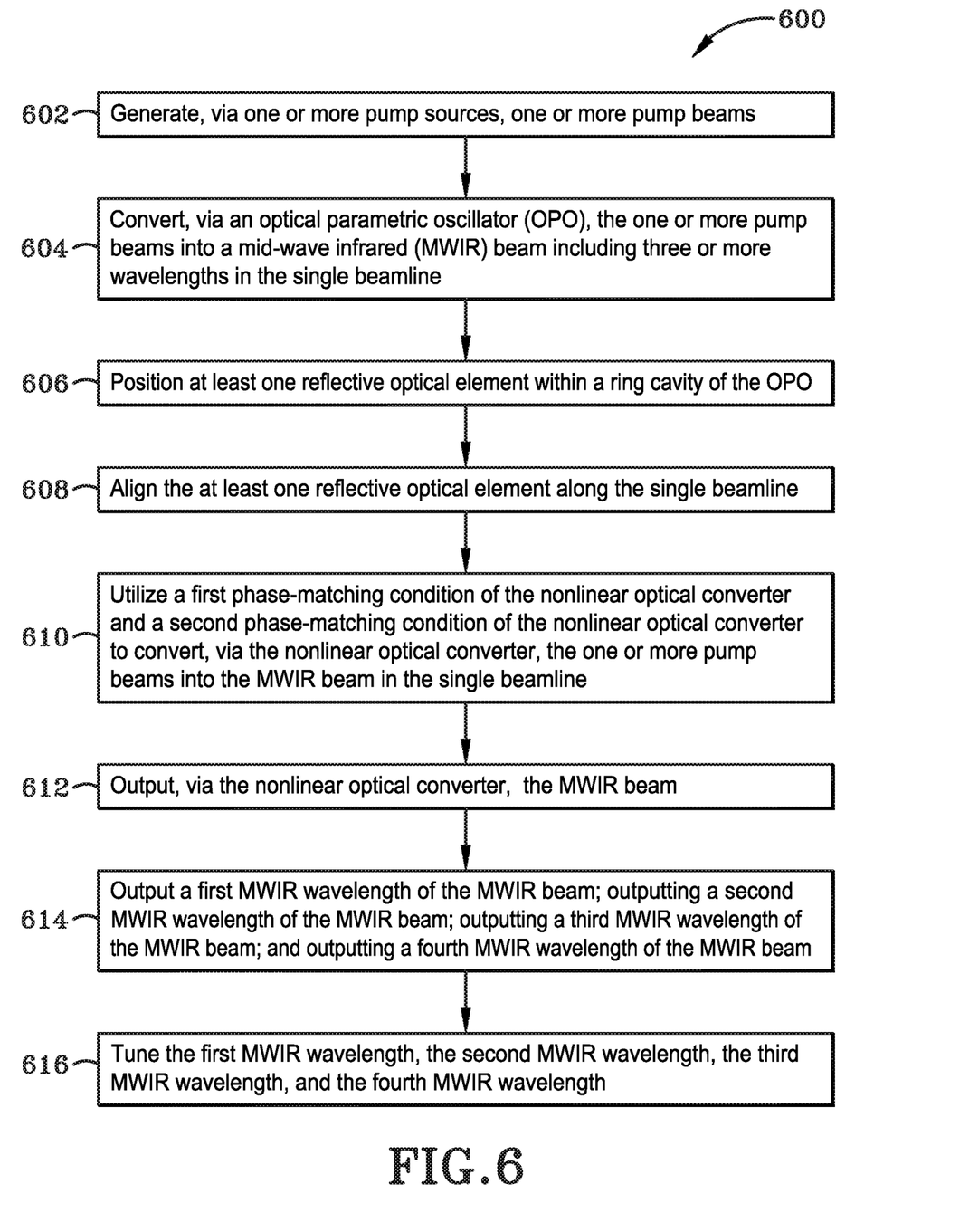
FIG. 6 is a flow chart depicting a second exemplary method in accordance with one aspect of the present disclosure.

FIG. 6 is a flow chart depicting a second exemplary method for generating infrared radiation in accordance with one aspect of the present disclosure generally at 600. The method 600 may include generating, via one or more pump sources, one or more pump beams, which is shown generally at 602. The one or more pump beams may define a single beamline. The method 600 may include converting, via a nonlinear optical converter, the one or more pump beams into a mid-wave infrared (MWIR) beam including three or more wavelengths in the single beamline, which is shown generally at 604. In some implementations, this is accomplished by the OPO 22 generating a first signal wavelength, a first idler wavelength, a second signal wavelength, and a second idler wavelength where the first signal wavelength and the first idler wavelength may be independently variable from the second signal wavelength and the second idler wavelength. The MWIR beam 20 may be based, at least in part on the pump beam, the first signal beam, the first idler beam, the second signal beam, and the second idler beam. The first signal wavelength and the first idler wavelength may be varied and/or the second signal wavelength and the second idler wavelength may be varied to output the desired MWIR beam 20. In some implementations, the nonlinear optical converter may be an optical parametric oscillator (OPO), and the method 600 may further include positioning at least one reflective optical element within a ring cavity of the OPO, which is shown generally at 606. The method 600 may include aligning the at least one reflective optical element along the single beamline, which is shown generally at 608.

The method 600 may further include utilizing a first phase-matching condition of the nonlinear optical converter and a second phase-matching condition of the nonlinear optical converter to convert, via the nonlinear optical converter, the one or more pump beams into the MWIR beam in the single beamline, which is shown generally at 610. For example, first phase-matching condition and the second phase-matching condition may be implemented by at least one of aligning a first nonlinear optical crystal of the nonlinear optical converter along the single beamline, aligning a second nonlinear optical crystal of the nonlinear optical converter along the single beamline, and critically phase-matching the first nonlinear optical crystal and the second nonlinear optical crystal; positioning a walk-off compensated pair of nonlinear optical crystals of the nonlinear optical converter along the single beamline; and aligning a first quasi-phase-matched region of a quasi-phasematched crystal of the nonlinear optical converter and a second quasi-phase-matched region of a quasi-phase-matched crystal of the nonlinear optical converter along the single beamline.

The method 600 may include outputting, via the nonlinear optical converter, the MWIR beam, which is shown generally at 612. The method 600 may further include outputting a first MWIR wavelength of the MWIR beam; outputting a second MWIR wavelength of the MWIR beam; outputting a third MWIR wavelength of the MWIR beam; and outputting a fourth MWIR wavelength of the MWIR beam, which is shown generally at 614. In some implementations, the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength. The method 600 may further include tuning the first MWIR wavelength, the second MWIR wavelength, the third MWIR wavelength, and the fourth MWIR wavelength, which is shown generally at 616.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An infrared radiation source system, comprising:
one or more pump sources configured to generate one or more pump beams; wherein the one or more pump beams define a single beamline;
a nonlinear optical converter aligned along the single beamline; wherein the nonlinear optical converter generates a first signal wavelength, a first idler wavelength, a second signal wavelength, and a second idler wavelength; wherein the first signal wavelength and the first idler wavelength are independently variable from the second signal wavelength and the second idler wavelength; and wherein the infrared radiation source system is configured to output a mid-wave infrared (MWIR) beam including three or more wavelengths in the single beamline.

2. The infrared radiation source system of claim 1, further comprising:
a first phase-matching condition of the nonlinear optical converter; and
a second phase-matching condition of the nonlinear optical converter.

3. The infrared radiation source system of claim 1, further comprising:
a first MWIR wavelength of the MWIR beam;
a second MWIR wavelength of the MWIR beam;
a third MWIR wavelength of the MWIR beam; and
a fourth MWIR wavelength of the MWIR beam.

4. The infrared radiation source system of claim 3, wherein the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength.

5. The infrared radiation source system of claim 3, wherein the first MWIR wavelength, the second MWIR wavelength, the third MWIR wavelength, and the fourth MWIR wavelength are tunable.

6. The infrared radiation source system of claim 1, further comprising:
   a first nonlinear optical crystal of the nonlinear optical converter aligned along the single beamline; and
   a second nonlinear optical crystal of the nonlinear optical converter aligned along the single beamline; wherein the first nonlinear optical crystal and the second nonlinear optical crystal are critically phase-matched.

7. The infrared radiation source system of claim 1, further comprising:
   a quasi-phase-matched crystal of the nonlinear optical converter;
   a first quasi-phase-matched region of the quasi-phase-matched crystal aligned along the single beamline; and
   a second quasi-phase-matched region of the quasi-phase-matched crystal aligned along the single beamline.

8. The infrared radiation source system of claim 1, wherein the nonlinear optical converter is an optical parametric oscillator (OPO), the system further comprising:
   a ring cavity of the OPO;
   at least one reflective optical element positioned within the ring cavity and along the single beamline;
   a first nonlinear optical crystal of the OPO aligned along the single beamline; and
   a second nonlinear optical crystal of the OPO aligned along the single beamline; wherein the first nonlinear optical crystal and the second nonlinear optical crystal are critically phase-matched.

9. The infrared source system of claim 1, wherein the nonlinear optical converter is an optical parametric oscillator (OPO), the system further comprising:
   a ring cavity of the OPO;
   at least one reflective optical element positioned within the ring cavity and along the single beamline; and
   a walk-off compensated pair of nonlinear optical crystals of the OPO aligned along the single beamline.

10. The infrared radiation source system of claim 1, wherein the nonlinear optical converter is an optical parametric oscillator (OPO), the system further comprising:
    a ring cavity of the OPO;
    at least one reflective optical element positioned within the ring cavity and along the single beamline;
    a quasi-phase-matched crystal of the OPO;
    a first quasi-phase-matched region of the quasi-phase-matched crystal aligned along the single beamline; and
    a second quasi-phase-matched region of the quasi-phase-matched crystal aligned along the single beamline.

11. A method for generating infrared radiation, comprising:
    generating, via one or more pump sources, one or more pump beams;
    wherein the one or more pump beams define a single beamline;
    generating, via a nonlinear optical converter, a first signal wavelength, a first idler wavelength, a second signal wavelength, and a second idler wavelength based, at least in part, on the one or more pump beams; wherein the first signal wavelength and the first idler wavelength are independently variable from the second signal wavelength and the second idler wavelength; and
    outputting, via the nonlinear optical converter, a mid-wave infrared (MWIR) beam including three or more wavelengths in the single beamline.

12. The method of claim 11, further comprising:
    utilizing a first phase-matching condition of the nonlinear optical converter and a second phase-matching condition of the nonlinear optical converter to generate the first signal wavelength, the first idler wavelength, the second signal wavelength, and the second idler wavelength.

13. The method of claim 11, further comprising:
    outputting a first MWIR wavelength of the MWIR beam;
    outputting a second MWIR wavelength of the MWIR beam;
    outputting a third MWIR wavelength of the MWIR beam; and
    outputting a fourth MWIR wavelength of the MWIR beam.

14. The method of claim 13, wherein the first MWIR wavelength includes a pump beam wavelength; and wherein the second MWIR wavelength, the third MWIR wavelength, and the fourth MWIR wavelength include at least one of the first signal wavelength, the first idler wavelength, the second signal wavelength, and the second idler wavelength.

15. The method of claim 13, further comprising:
    tuning the first MWIR wavelength, the second MWIR wavelength, the third MWIR wavelength, and the fourth MWIR wavelength.

16. The method of claim 11, further comprising:
    aligning a first nonlinear optical crystal of the nonlinear optical converter along the single beamline;
    aligning a second nonlinear optical crystal of the nonlinear optical converter along the single beamline; and
    critically phase-matching the first nonlinear optical crystal and the second nonlinear optical crystal.

17. The method of claim 11, further comprising:
    aligning a first quasi-phase-matched region of a quasi-phase-matched crystal of the nonlinear optical converter along the single beamline; and
    aligning a second quasi-phase-matched region of a quasi-phase-matched crystal of the nonlinear optical converter along the single beamline.

18. The method of claim 11, wherein the nonlinear optical converter is an optical parametric oscillator (OPO), the method further comprising:
    positioning at least one reflective optical element within a ring cavity of the OPO;
    aligning the at least one reflective optical element along the single beamline;
    aligning a first nonlinear optical crystal of the OPO along the single beamline;
    aligning a second nonlinear optical crystal of the OPO along the single beamline; and
    critically phase-matching the first nonlinear optical crystal and the second nonlinear optical crystal.

19. The method of claim 11, wherein the nonlinear optical converter is an optical parametric oscillator (OPO), the method further comprising:
    positioning at least one reflective optical element within a ring cavity of the OPO; and
    aligning a walk-off compensated pair of nonlinear optical crystals of the OPO along the single beamline.

20. The method of claim 19, wherein the nonlinear optical converter is an optical parametric oscillator (OPO), the method further comprising:
    positioning at least one reflective optical element within a ring cavity of the OPO;
    aligning the at least one reflective optical element along the single beamline;

aligning a first quasi-phase-matched region of a quasi-phase-matched crystal of the OPO along the single beamline; and
aligning a second quasi-phase-matched region of a quasi-phase-matched crystal of the OPO along the single beamline.

* * * * *